(12) United States Patent
Williams et al.

(10) Patent No.: US 11,097,534 B2
(45) Date of Patent: Aug. 24, 2021

(54) VISUAL INK SAVINGS

(71) Applicant: Electronics for Imaging, Inc., Fremont, CA (US)

(72) Inventors: Leon Calvin Williams, Foster City, CA (US); Theodore A Olson, Minneapolis, MN (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 16/422,864

(22) Filed: May 24, 2019

(65) Prior Publication Data

US 2020/0369024 A1 Nov. 26, 2020

(51) Int. Cl.
*B41J 2/045* (2006.01)
*H04N 1/60* (2006.01)
*B41J 2/21* (2006.01)

(52) U.S. Cl.
CPC ........... *B41J 2/04508* (2013.01); *B41J 2/211* (2013.01); *B41J 2/2139* (2013.01); *B41J 2/2142* (2013.01); *H04N 1/603* (2013.01)

(58) Field of Classification Search
CPC ............... B41J 2/04518; B41J 2/04501; B41J 2/04508; B41J 2/2139; B41J 2/211; B41J 2/2142; H04N 1/603
See application file for complete search history.

(56) References Cited

U.S. PATENT DOCUMENTS

| 8,542,405 | B2* | 9/2013 | Fischer | H04N 1/603 358/1.9 |
|---|---|---|---|---|
| 9,994,053 | B2 | 6/2018 | Schuppan | |
| 2009/0296153 | A1* | 12/2009 | Wang | H04N 1/603 358/3.01 |
| 2016/0103633 | A1 | 4/2016 | Huijbers et al. | |
| 2017/0253063 | A1* | 9/2017 | Schuppan | H04N 1/6063 |

* cited by examiner

*Primary Examiner* — Bradley W Thies
(74) *Attorney, Agent, or Firm* — Perkins Coie LLP

(57) ABSTRACT

When a job does not exactly match the purpose of a printing profile but would benefit from some of the characteristics of a different printing profile, dynamically making the tradeoffs between the printing profiles is desirable. For example, a high-ink, large gamut profile might not be needed for a particular job, but an ink-saving profile would be excessively grainy. An intermediate profile would be recommended. Alternatively, the ink-saving profile can be adequate for everything except the skin tones in the print. Presented here are systems and methods to create a blended representation that could adopt the high-ink rules for a portion of the image, but ink-saving rules elsewhere. For example, the high-ink rules can be applied to the skin colors, but ink-saving rules can be applied in other parts of the image.

20 Claims, 9 Drawing Sheets
(3 of 9 Drawing Sheet(s) Filed in Color)

VISUAL INK SAVINGS

TECHNICAL FIELD

The present application is related to printing, and more specifically to methods and systems that reduce undesirable printing properties such as printer ink consumption, printing time, wear and/or tear of the printer nozzles.

BACKGROUND

The International Color Consortium (ICC) has standardized the format of color profiles, but the process of profiling itself allows for variations in the resulting performance and characteristics of the printer output. A profile can be created that makes specific tradeoffs between different desired behaviors such as color smoothness and ink usage. Different printing jobs will benefit from the selection of the appropriate profile for the task. For example, a cost-sensitive job would want to use a profile that has low ink usage, where the black ink is heavily used for the neutral components (high gray component replacement (GCR) printing profile). A job that demands high image quality would benefit from a high ink use profile, to minimize graininess. A job with an extended color gamut would benefit from a profile that uses all channels of an N-color printer, while other jobs could be run with fewer colorants. Profiles can be made and customized to each of these purposes. The process of making profiles can be expensive and time-consuming, however, and each resulting profile represents a single special purpose.

SUMMARY

When a job does not exactly match the purpose of a printing profile but would benefit from some of the characteristics of a different printing profile, dynamically making the tradeoffs between the printing profiles is desirable. For example, a high-ink, large gamut profile might not be needed for a particular job, but an ink-saving profile would be excessively grainy. An intermediate profile would be recommended. Alternatively, the ink-saving profile can be adequate for everything except the skin tones in the print.

Presented here are systems and methods to create a blended representation that could adopt the high-ink rules for a portion of the image but ink-saving rules elsewhere. For example, the high-ink rules can be applied to the skin colors that are sensitive to graininess, but ink-saving rules can be applied in other parts of the image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Visual Ink Savings

When a job does not exactly match the purpose of a printing profile but would benefit from some of the characteristics of a different printing profile, dynamically making the tradeoffs between the printing profiles is desirable. For example, a high-ink, large gamut profile might not be needed for a particular job, but an ink-saving profile would be excessively grainy. An intermediate profile would be recommended. Alternatively, the ink-saving profile can be adequate for everything except the skin tones in the print.

Presented here are systems and methods to create a blended representation that could adopt the high-ink rules for a portion of the image, but ink-saving rules elsewhere. For example, the high-ink rules can be applied to the skin colors, but ink-saving rules can be applied in other parts of the image.

A high image quality, high ink-use profile is normally used for the jobs sent to a given printer. There is an alternative profile available, however, one that uses a maximum gray component replacement (GCR) strategy to minimize total ink use. A print made from each of these profiles would be colorimetrically identical, but a visual inspection would reveal areas where the halftone patterns are noticeably different. The high use of black ink results in a grainy appearance in the print fully using the GCR profile.

Conceptually, the blended representation can take a fraction of the ink levels specified by the original profile and the remaining fraction from the alternate. Although a blend between two ink recipes for a common color is not guaranteed to stay at that color, in practice the differences are slight. This is the basis behind the "Alternate Profile" feature.

Figure 1:
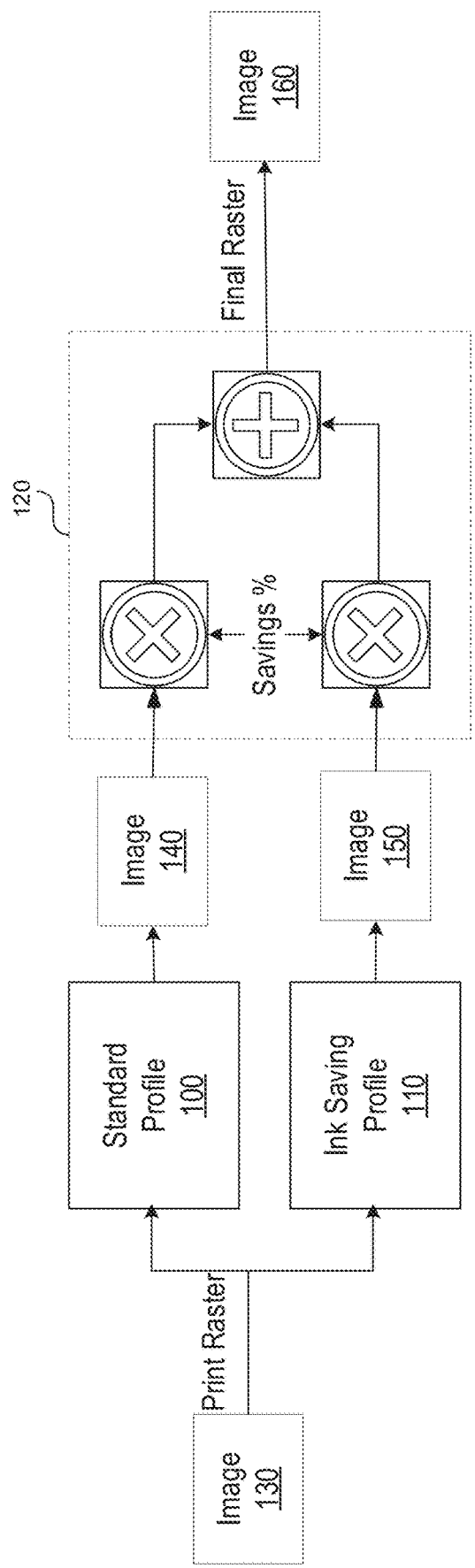
FIG. 1 shows a blending of an image using two profiles.

FIG. 1 shows a blending of an image using two profiles. The first printing profile 100 can be a standard profile that produces high quality images but requires more ink, more time to print, and/or causes more wear and tear on a printer. The second printing profile 110 can be an alternate profile and can produce lower image quality but can be require less ink, less time to print, and/or reduce wear and tear on the printer. For example, the standard profile 100 can be a low GCR, while the alternate profile 110 can be a high GCR profile. In another example, the standard profile 100 can be an expanded color gamut profile, while the alternate profile 110 can be a 4-color gamut profile.

The blended representation 120 can be a combination of the standard profile 100 and the alternate profile 110. The blended representation 120 can specify how to combine the standard profile 100 and the alternate profile 110. For example, the blended representation 120 can specify an amount of the standard profile 100 and an amount of the alternate profile 110 to use. In another example, the blended representation 120 can specify which color should use which amount of the first 100 and/or the second 110 profile. In a third example, the blended representation 120 can specify what region of an image should use what amount of the first 100 and/or the second 110 profile.

To apply the blended representation 120 to an image 130, the image 130 can be rasterized using the standard profile 100 and the alternate profile 110 to obtain raster images 140, 150, respectively. The images 140, 150 can be blended using the blended representation 120 to obtain the final image 160, and rasterized using the blended representation 120.

Figure 2:
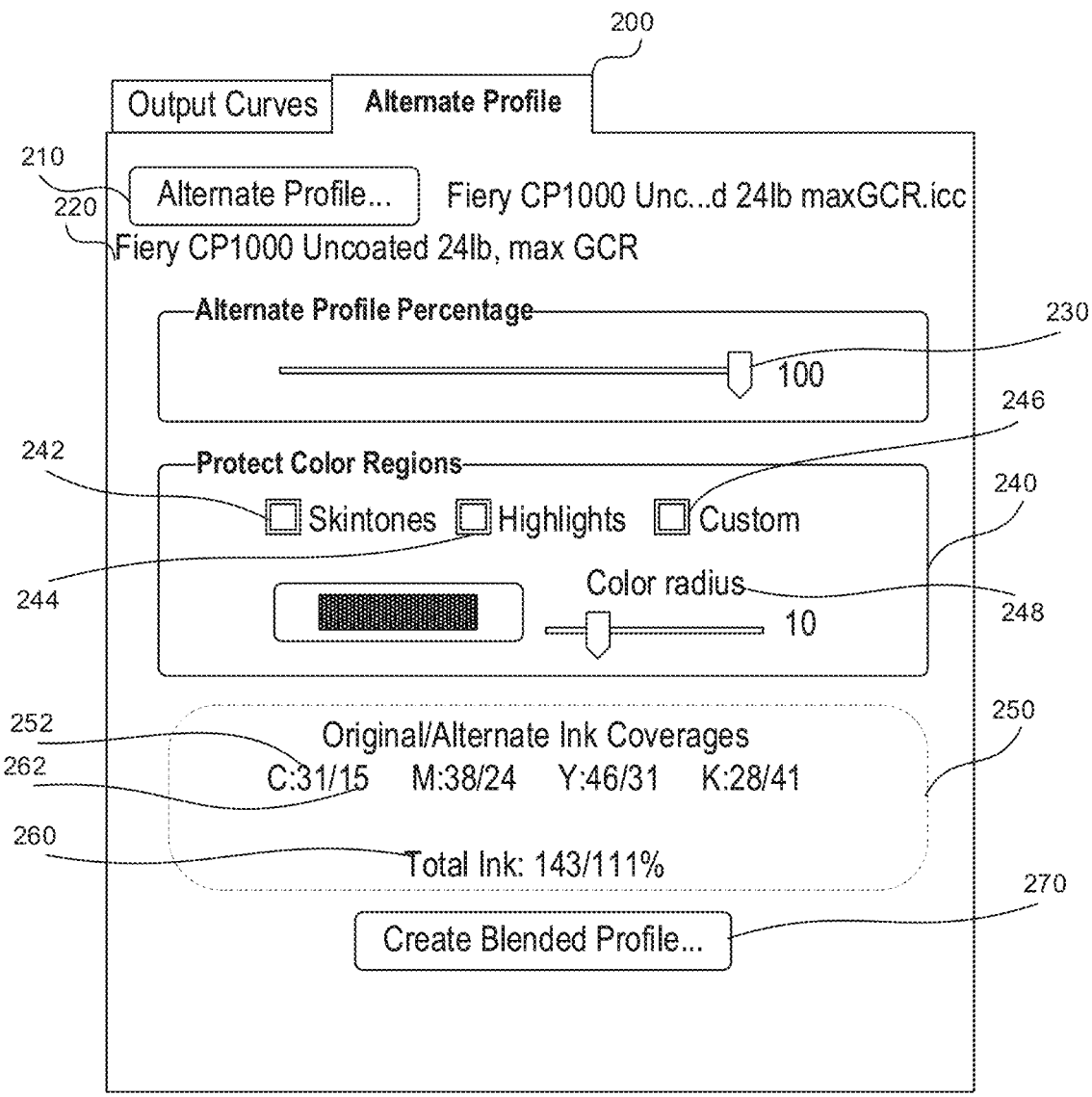
FIG. 2 shows functionality available when blending two profiles.

FIG. 2 shows functionality available when blending two profiles 100, 110 in FIG. 1. The blending functionality can be shown in a graphical user interface as an Alternate Profile tab 200. The Alternate Profile button 210 can allow a user to browse and select one or more profiles to blend. One profile can be a main profile for the printer, while the alternate profile can be the selected profile 220, such as "Fiery CP 1000 Uncoated 24 lb, max GCR." The alternate profile 220 must represent the same printer as the main profile. If the two profiles do not represent the same printer, with the same colorants, the blending between the two profiles may not be meaningful.

The slider 230 can control how much of the alternate profile 220 is being used. The slider at 100% can mean that the image is represented entirely by the alternate profile 220. The slider at 0% can mean that none of the alternate profile 220 is contributing and the image is represented entirely by the main profile. Sliding between 0% and 100% can yield intermediate color output: a 50% setting can be an ink combination that can be an equal mix between the inks specified by each profile.

The section 240 in the alternate profile tab 200 can allow a user to "protect" certain colors, meaning that the colors can be rendered by the primary profile, not the alternate profile 220, regardless of the slider position. Alternatively, a special slider position can be specified for each of the protected colors. Two important colors are skin tones and highlights, which may be sensitive to any grainy texture that might result from a high GCR alternate profile. These color areas are masked and protected when their checkbox 242, 244 is selected.

A checkbox 246 can enable a user to specify a third color, or a mask specifying a protected region of the image, such as a periphery of the image, to which a special amount of main and alternate profile can be applied. The special amount of main and alternate profile can be specified by a different slider or can be presumed to be 100% main profile and 0% alternate profile. A spot color, or named color such as a Pantone color reference, is an example of a third color that may be masked.

To specify the third color, the user can select the third color from a color picker that is displayed when the checkbox 246 is selected. In addition, when the checkbox 246 is selected, the user can be enabled to upload a file specifying the protected region of the image.

The color radius slider 248 can enable the user to specify a color range around the skin tone, highlight and/or custom color that is protected by a soft mask that tapers smoothly to the unprotected color regions. The radius can be expressed in L*a*b* units. In addition, the color radius slider 248 can be specified individually for each protected color, or the color radius slider 248 can control the color range around all the protected colors. An additional radius slider (not displayed) can control a tapering region when the user specifies the protected region of image.

A section 250 shows the amount of ink used in the rasterized print. For each ink, the numbers can be the fraction of each ink plate used, 100 means the entire plate is covered by 100% of that ink. Acronym CMYK stands for cyan, magenta, yellow and black, respectively. The first number 252 (only one labeled for brevity) can be the ink specified by the primary profile, the second number 262 (only one labeled for brevity) can be the ink used by the blended representation. As the slider moves from 100%, the second number 262 can start at the ink coverage of the alternate profile and change. At zero, the two numbers 252 and 262 can be the same, namely, the coverage of the primary profile.

The total ink coverage 260 can be the sum of the individual ink coverages. The total area in the current case, given 4 colors is 400%. Printing using the main profile covers 143% of the 400% area, while printing using both the main and the alternate profile 220 covers 111% of total area. Consequently, printing using both the main and the alternate profile 220 can result in 32% of ink savings.

Figure 4:
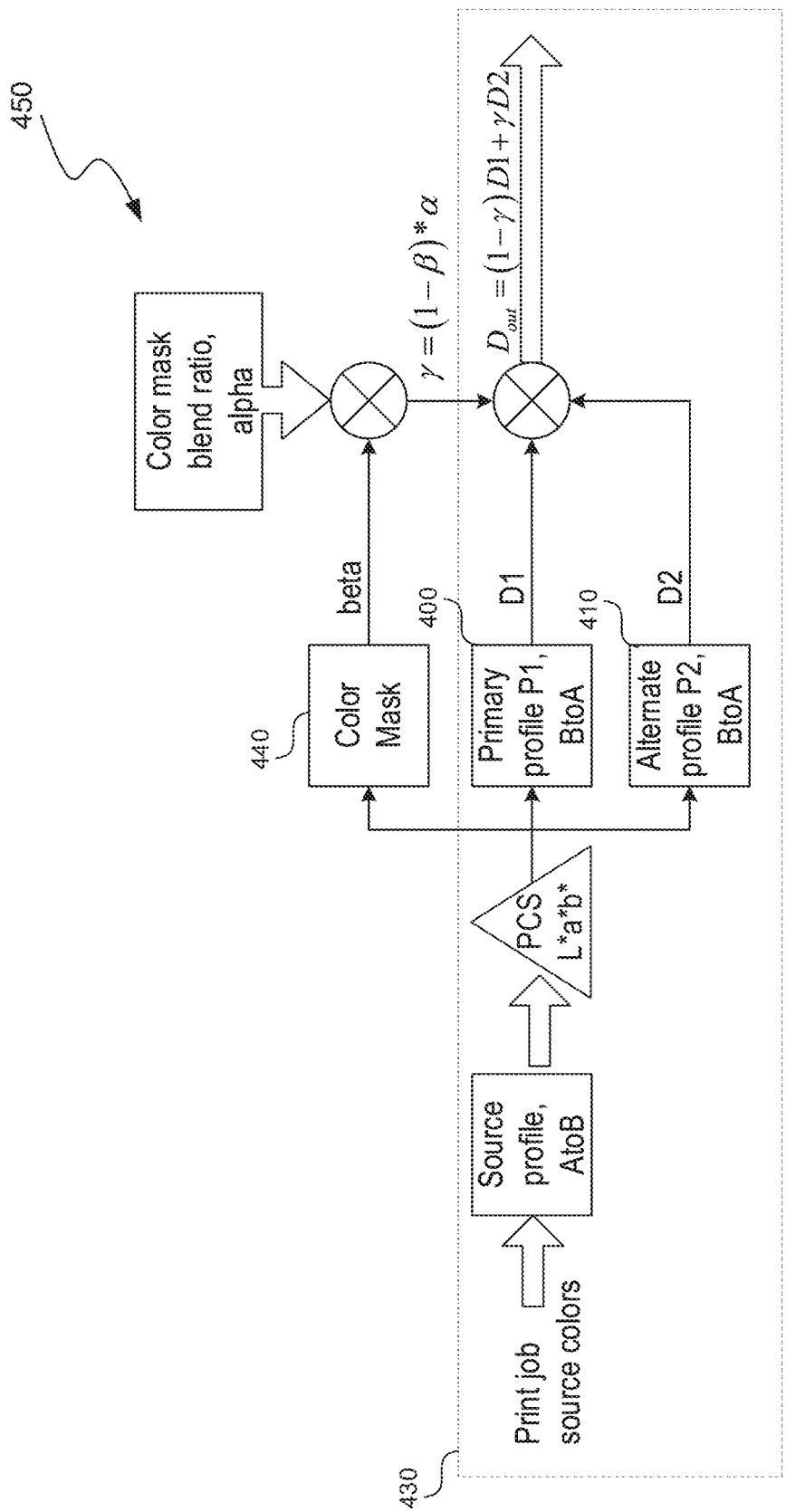
FIG. 4 shows a blending operation between a primary and an alternate profile.

The button 270 can capture the blending of the main profile and the alternate profile 220, the color masks, and/or region masks and create a new ICC-formatted profile, namely, the blended representation. The blended representation can be used directly in processing the current or subsequent jobs. In one example, when the blended representation is a printing profile, the color masks can be included in the blended representation but the region masks cannot. Region masks, however, can be applied when the blended representation is a description of how to combine images produced using the first printing profile and the second printing profile. The description can include one or more functions as shown in FIGS. 1, 4.

Figure 3A:
FIGS. 3A-3C show various visual comparisons of an original printing profile and a blended representation.
Figure 3B:
Figure 3C:

FIGS. 3A-3C show various visual comparisons of an original printing profile and a blended representation. Visual comparison of two printing profiles in FIG. 3A can show little or no difference. Visual comparison of two printing profiles in FIG. 3B can show large visual difference when viewing only the black channel. FIG. 3A shows a color image comparison between an upper half 300 of the image printed using an original printing profile, such as the high quality, high ink profile, and the bottom half 310 of the image printed using a blended representation. A visualization manipulation tool 320 can be provided to enable a user to compare the two images 300, 310 by co-locating them. As shown in FIG. 3A, the two images can be collocated using a split screen that can allow a visual preview of how an image is rendered via two distinct profiles.

As can be seen in FIG. 3A, a continuous-tone, i.e. contone, display usually does not show much difference, since the profiles are rendering ink combinations that are colorimetrically equivalent. By looking at the comparison in FIG. 3A, the user can ensure that the blended representation substantially preserves the image quality of the original profile, while the original/alternate ink coverages section 250 in FIG. 2 shows the ink savings achieved using the blended representation.

The user can manipulate the location of the visualization manipulation tool 320 by translating or rotating. The user can manipulate the image location by translation rotation with respect to the visualization manipulation tool 320.

FIG. 3B shows a single-color comparison between the upper half of the image 330 printed using the original printing profile, and the bottom half of the image 340 printed using the blended representation. The single color in FIG. 3B is "K", i.e. black. As can be seen in FIG. 3B, the lower half of the image 340 uses more black than the upper half of the image 330. Specifically, the portion 352 of the region 350 that is part of the upper half of the image appears less black than the portion 354 of the region 350 that is part of the lower half of the image, even though there is no perceivable difference in the same region 355 in FIG. 3A. The reason the region 352 appears less black than the region 354 is that in the region 352, colors CMY are used to achieve the particular gray tone, and in the region 352, the color black is used to achieve a similar gray tone. Generally, a little bit extra black ink used in the region 354 costs less than the combined CMY colors to get the same equivalent gray tone the region 352.

FIG. 3C shows a halftone printing pattern comparison between the upper half 360 of the image printed using the original printing profile, and the bottom half 370 of the image printed using the blended representation. The halftone printing pattern utilized by a printer can be shown on a contone display, such as an LCD screen, when enlarged. As can be seen, the halftone of the upper half 360 of the image uses less black ink, and uses CMY colors to achieve black, than the halftone of the bottom half 370 of the image.

A processor associated with the display showing the images in FIGS. 3A-3C and/or associated with the Alternate Profile tab 200 in FIG. 2 can automatically determine which images to display to the user, such as images shown in FIGS. 3A-3C. The processor can determine a parameter in the first printing profile and the second printing profile that produces a visible difference when the image is printed using the first printing profile and the image is printed using the second printing profile. The processor can create the visual comparison by displaying a first image representing a value of the parameter in the first printing profile and a second image representing the value of the parameter in the second printing profile, and presenting the first image and the second image for comparison.

For example, the processor can determine that the second printing profile uses more black ink, the two profiles differ in the size of the halftone dots, that a color is missing from one profile, etc. Consequently, the processor can display an image that highlights the particular difference. In one example, the processor can render a single color (black) image as shown in FIG. 3B to compare two images that differ in usage of black ink. In another example, the processor can render an enlarged halftone view of the two profiles to compare two images that differ in halftone dot size. In a third example, the processor can render a single color image, using the color missing from one of the profiles to compare two images that differ in color gamut.

FIG. 4 shows a blending operation between a primary and an alternate profile. One implementation for blending the primary 400 and the alternate profile 410 is through alpha blending depicted in the pipeline 430. When there is no color mask, the value of beta is 0 and gamma and alpha are the same. Alpha blending can be used to represent the alternate profile percentage slider 230 in FIG. 2. In alpha blending, a print job, such as an image to be printed, can be processed through each of the profiles 400, 410 and the outputs can be blended according to the ratio set by the slider 230. The "alpha" value can range from 0.0 to 1.0:

$$D_{out}=(1.0-\text{alpha})*D1+\text{alpha}*D2 \quad (1)$$

Where D1 and D2 are the device code colors obtained from the primary profile 400, and the alternate profile 410 respectively. The conventional method to obtain D1 and D2 is to first convert the source color specified in the print job to the device-independent profile connection space (PCS). This is either the CIE tristimulus XYZ space or the CIE L*a*b* color space. From PCS, the primary 400 and alternate profile 410 can be used to convert into printer device codes D1 and D2, which can then be blended according to the above formula (1).

To provide for the selective blending of the profiles based on color, additional information and control is required, and full pipeline 450 can be used. A color mask 440 can be used which represents the three-dimensional region, in L*a*b* color space, that is to be "protected," meaning that colors in this region can be rendered using the primary profile 400 only, regardless of the slider 230 setting. The values contained in the color mask 440, beta, can range from 0.0 (NOT the target color) to 1.0 (at or near the target color), with intermediate values providing a soft transition to colors in the neighborhood.

To apply the color mask 440 value, beta, along with the blend fraction, alpha, to the blending equation, an intermediate value, gamma, is calculated, and used:

$$\text{gamma}=(1.0-\text{beta})*\text{alpha} \quad (2)$$

$$D_{out}=(1.0-\text{gamma})*D1+\text{gamma}*D2 \quad (3)$$

Whenever a color is far from the target color, beta is zero, and gamma is the same as alpha. Whenever the color is the target color, beta is one, gamma becomes zero, and the device color from the primary profile 400, D1 is used exclusively.

The implementation of the color mask 440 can be done in a variety of methods. The color mask 440 can be a computed function of the PCS coordinates L*a*b*, or the color mask 440 can be represented by a 3D lookup table indexed by those coordinates. The latter is conveniently provided by the structure of an ICC profile with its multidimensional lookup tables.

An interactive preview, such as shown in FIGS. 3A-3C, can be provided by converting from the printer device codes, D1 and D2, back to PCS and then to a monitor display space, typically RGB. The mechanism to display a printer profile output includes an N-dimensional lookup table that converts from the N channels (such as CMYKOVG—cyan, magenta, yellow, black, orange, violet, green) of printer device codes to the RGB that will be displayed to represent the printer profile. This conversion (from printer codes to PCS to RGB) is independent of the primary and alternate profiles, which differ only in their PCS to device direction. This means that either or both of the two output images in device codes D1 or D2 may use the same mechanism to display them, namely the N-channel to RGB conversion table.

Given the output from one of the profiles, say P1, the primary profile 400, it is possible to obtain the output of the alternate profile 410 P2, by building a profile link between them. The profile link represents the conversion of device code D1 to PCS, followed by the conversion to the alternate device code D2. If P1 and P2 differ in their GCR strategy, the link profile would convert from one to the other, showing as differences in the color separations that result.

If P2 is a subset of the colorants of P1, then the conversion to P2 will have a reduced color gamut. The color separations for the unused colorants in P2 would be blank. Building the reverse link, from P2 to P1, would utilize all the colorants of P1, but not all of the potential color gamut will be available—only those colors reachable by the subset in P2 are represented in the link profile.

The blended representation that captures the blend ratio and color mask can be generated using ICC multidimensional table structures. The input tables (device to PCS direction) are the same as the input tables in both P1 and P2; they all represent the mapping of printer colorants to device-independent PCS. The output tables, however, must be populated with the result of the blend equation (3).

To do this, each node of the output table is reverse mapped to PCS coordinates. That location in PCS is then converted to D1, D2, and beta, using profiles P1, P2, and the color mask 440 function/table. D1, D2, beta, and the blend ratio alpha are then used to evaluate the net device code of the blended representation, which is then placed at the output table node.

Figure 5:
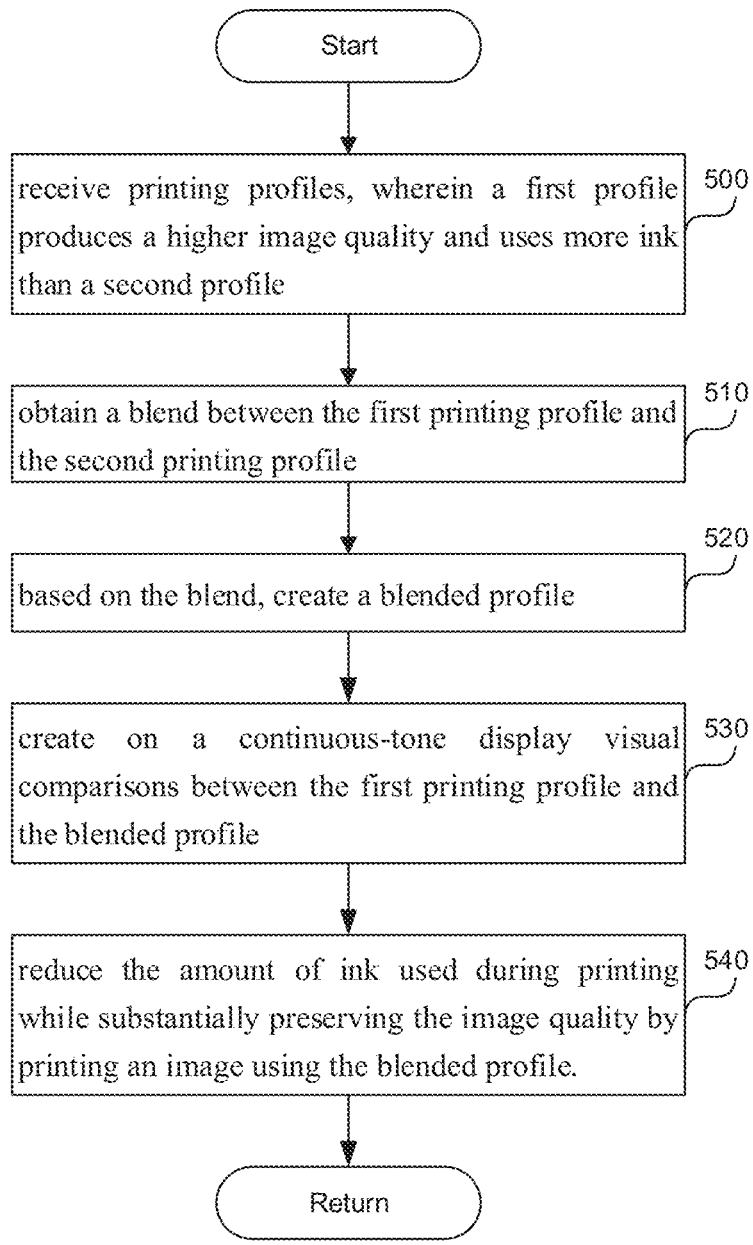
FIG. 5 is a flowchart of a method to reduce an amount of ink used during printing while substantially preserving image quality.

FIG. 5 is a flowchart of a method to reduce an amount of ink used during printing while substantially preserving image quality. In step 500, the processor can receive multiple printing profiles indicating a tradeoff between desired behaviors including a color smoothness and an ink usage. A first printing profile among the multiple printing profiles can produce a higher image quality and can use more ink than a second printing profile among the multiple printing profiles. The first profile can be the standard or the primary profile 100 in FIG. 1, 400 in FIG. 4, while the second profile can be the alternate profile 110 in FIG. 1, 410 in FIG. 4. The printing profile can determine how colors are printed for a specific printer and paper. The printing profile can transform an image from the color space of the image to the color space of the printer and paper.

In step 510, the processor can obtain a blend between the first printing profile and the second printing profile. In step 520, based on the blend, the processor can create a blended representation configured to reduce an amount of ink used during printing while substantially preserving image quality. In addition, the blended representation can reduce printing time, wear and tear on the printing nozzles, etc.

In step 520, the processor can create on a continuous-tone display, i.e., contone display, such as an LCD or an OLED display, multiple visual comparisons between the first printing profile and the blended representation, such as shown in FIGS. 3A-3C. The multiple visual comparisons can include a halftone visualization of the first printing profile and the blended representation. A contone display reproduces each color at any point in the image as a single tone, and not as discrete halftones, such as one single color for monochromatic prints, or a combination of halftones for color prints. Halftone is an image or production technique that simulates continuous-tone imagery through the use of dots, varying either in size or in spacing, thus generating a gradient-like effect.

In step 530, the processor can reduce the amount of ink used during printing while substantially preserving the image quality by printing an image using the blended representation. A substantial preservation of the image quality is shown in FIG. 3A, where a cursory glance at the color images 300 and 310 in FIG. 3A using two different printing profiles does not disclose a visual difference between the images 300 and 310. In some cases, even when the images 300 and 310 are collocated, the visual difference between the two images is not apparent. In other cases, even after careful visual inspection of the two images 300 and 310, the visual difference between the two images is not apparent.

Figure 6:
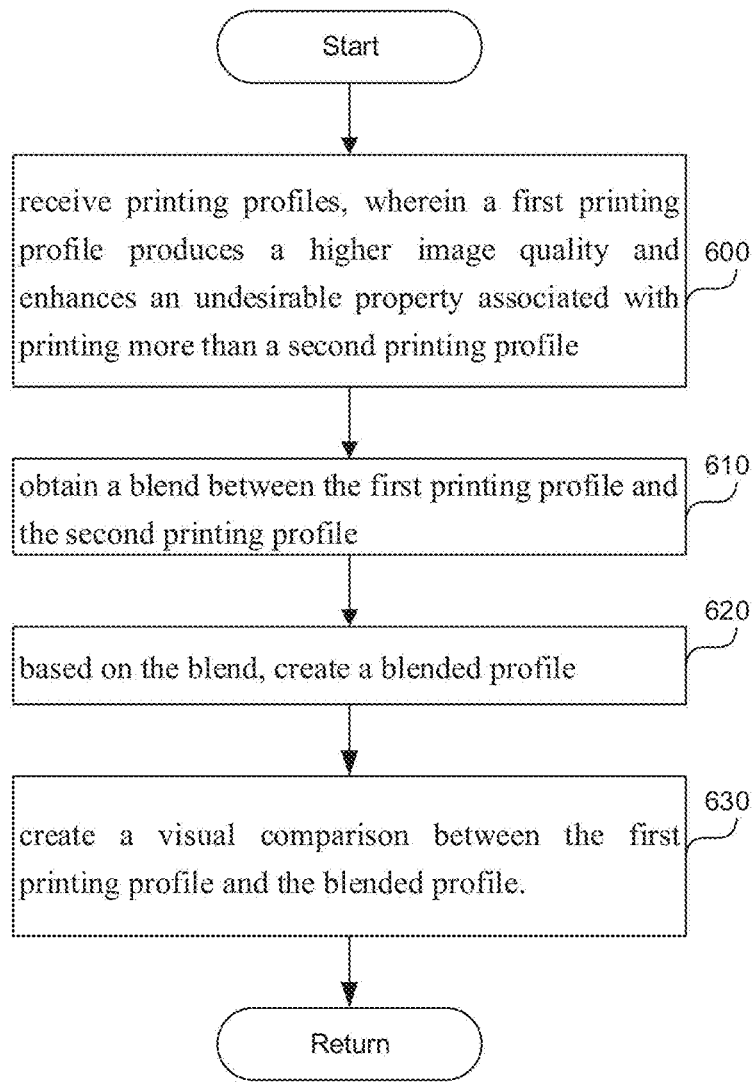
FIG. 6 is a flowchart of a method to diminish an undesirable property associated with printing while substantially preserving image quality.

FIG. 6 is a flowchart of a method to diminish an undesirable property associated with printing while substantially preserving image quality. In step 600, a processor can receive multiple printing profiles indicating a tradeoff between desired printer behaviors. A first printing profile in the multiple printing profiles can produce a higher image quality, a process which can exacerbate an undesirable property associated with printing an image more than printing with a second printing profile would. The undesirable property can be increased ink usage, increased wear and tear on the nozzles, increased printing time. The first profile can be the standard or the primary profile 100 in FIG. 1, 400 in FIG. 4, while the second profile can be the alternate profile 110 in FIG. 1, 410 in FIG. 4. The printer profile can include color smoothness, color gamut and/or ink usage.

In step 610, the processor can obtain a blend between the first printing profile and the second printing profile. In step 620, based on the blend, the processor can create a blended representation configured to diminish the undesirable property associated with printing an image while substantially preserving image quality. The undesirable property can be ink usage, printing time, wear and tear on a printer nozzle, etc.

In step 630, based on the multiple printing profiles and the blended representation, the processor can create a visual comparison between the first printing profile in the multiple printing profiles and the blended representation. The visual comparison can show an appearance of an image reproduced using the first printing profile and the image reproduced using the blended representation. The two images can be collocated, such as shown in FIGS. 3A-3B. The collocated images can also enable a user to superimpose one image over the other, such as by switching, in rapid succession, between the two images. The co-location of the images enables the user to more closely inspect and identify any visual differences between the two images.

The processor can calculate an amount of the undesirable property used by the first printing profile and the amount of the undesirable property used by the second printing profile. The undesirable property can be an amount of ink, printing time and/or wear and tear on the printer nozzles. The processor can provide a comparison between the first amount of the undesirable property and the second amount of the undesirable property to a user.

The processor can automatically determine how to blend the first profile and the second profile. The processor can receive an image to reproduce. The processor can detect a property associated with the image to reproduce, such as an object in the image to reproduce or a type of the image to reproduce. An object in the image to reproduce can include a face, skin, highlight, etc. The type of the image to reproduce can be a business graphic, a photograph, a poster, etc.

Based on the property, the processor can determine the blend between the first printing profile and the second printing profile. For example, when the processor detects the face, skin, or highlight, the processor can automatically switch to using the first profile when printing the object. In another example, if the processor detects that the type of image does not need a high quality print, such as a business graphic, the processor can automatically switch to the second printing profile. When the image needs a high quality print, the processor can automatically switch to the first printing profile.

In addition, an artificial intelligence can be trained to automatically blend between the first and the second printing profile. For example, the artificial intelligence can be provided as input an image, and can produce a blended representation. When the blended representation is desirable, the artificial intelligence can be positively reinforced, while when the blended representation is not desirable, the artificial intelligence can be negatively reinforced.

The processor can store the blended representation for use in reproducing a subsequent image. The blended representation can be automatically generated, or can be generated by a user. The processor can store image properties printed using the blended representation, and look for those properties in the subsequent images. For example, the processor can store in a database the blended representation and one or more properties of the image printed using the blended representation, such as objects in image, type of image, which colors in the image are printed using which profile, etc. When the processor receives a second image to print, the processor can automatically detect properties of the second image, and find a list of properties among the stored properties in the database that match the properties of the second image better than a majority of other properties associated with other blending profiles. The processor can use the blended representation associated with the closest list of properties to print the second image.

The blended representation can be a new printing profile, and/or can designate how to combine the images from the first printing profile and the second printing profile. The blended representation can indicate a first amount of the first printing profile and a second amount of the second printing profile to use when reproducing the image. The blended representation can indicate a color, a first amount of the first printing profile and a second amount of the second printing profile to use when reproducing the color. For example, the blended representation can indicate special treatment for skin tones, highlights, and/or certain colors. The blended representation can indicate a region of the image, a first amount of the first printing profile and a second amount of the second printing profile to use when reproducing the region of the image. For example, the blended representation can indicate to use the first printing profile in the center of the image and to use the second printing profile along the periphery of the image.

The processor can display the visual comparison showing a first appearance of a color in the image printed using the first printing profile and a second appearance of the color in the image printed using the blended representation. The visual comparison can include multiple images such as images shown in FIGS. 3A-3C, to show various comparisons. The visual comparison can include a comparison along a single color, such as black as in FIG. 3B, or a color missing in one of the profiles. The visual and comparison can include an enlarged halftone comparison as shown in FIG. 3C, or the visual comparison can include the final appearance of the image as shown in FIG. 3A.

The processor can automatically determine a type of the visual comparison to show, such as a single color, full-color, halftone comparison, etc. The processor can determine a parameter in the first printing profile and the second printing profile that produces a visible difference when the image is printed using the first printing profile and the image is printed using the second printing profile. The processor can create the visual comparison by displaying a first image representing a value of the parameter in the first printing profile and a second image representing the value of the parameter in the second printing profile, and presenting the first image and the second image for comparison. The parameter can be a color such as CMY, size of the halftone dots, color that is missing from one profile, etc.

The processor can enable the user to manipulate the visual comparison. The processor can provide a visualization manipulation tool enabling a user to select at least two printing profiles and to define at least two portions of the image to be displayed using the at least two printing profiles to create the visual comparison. For example, the processor can enable the user to swipe between the two images, superimpose the two images, choose which parameter of the two images to compare, etc.

Computer

Figure 7:
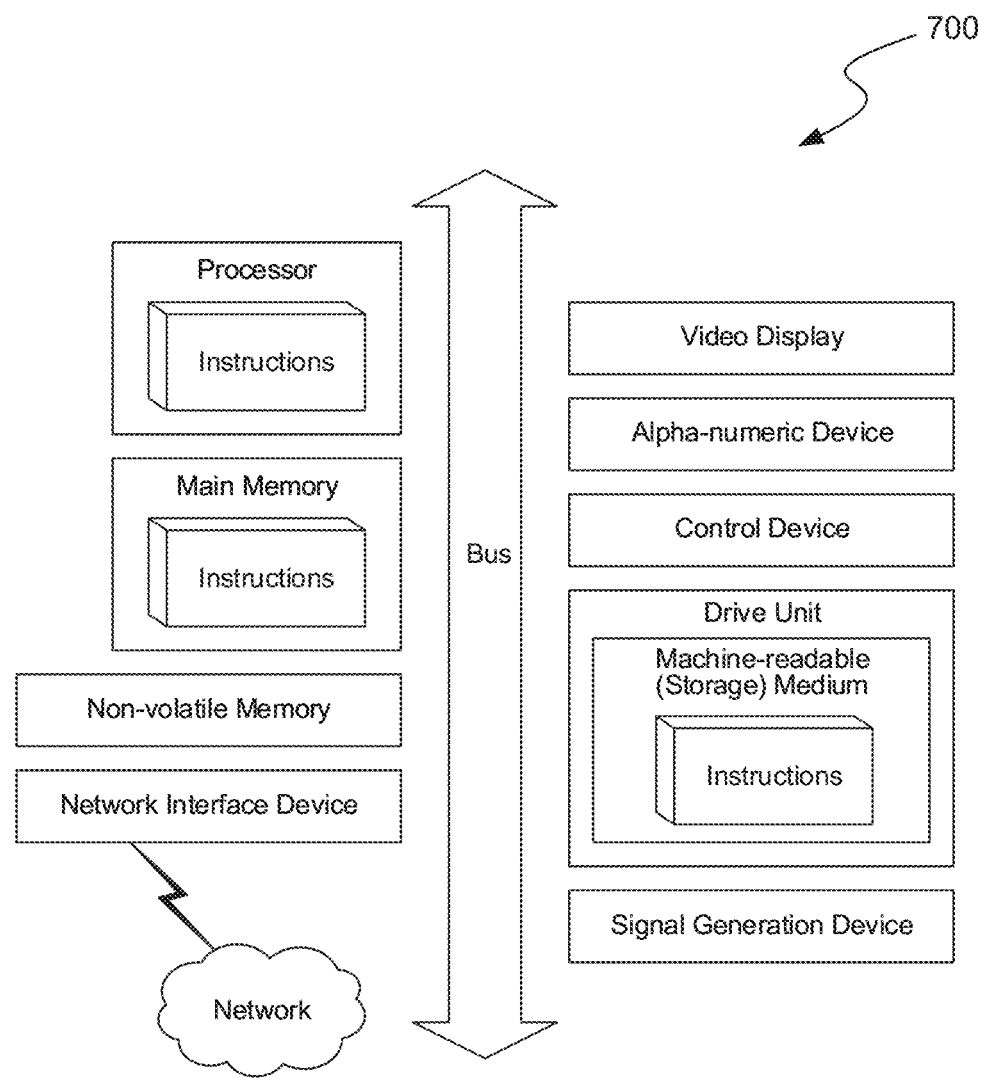
FIG. 7 is a diagrammatic representation of a machine in the example form of a computer system within which a set of instructions, for causing the machine to perform any one or more of the methodologies or modules discussed herein, may be executed.

FIG. 7 is a diagrammatic representation of a machine in the example form of a computer system 700 within which a set of instructions for causing the machine to perform any one or more of the methodologies or modules discussed herein, may be executed.

In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components described in the example of FIGS. 1-6 (and any other components described in this specification) can be implemented. The computer system 700 can be of any applicable known or convenient type. The components of the computer system 700 can be coupled together via a bus or through some other known or convenient device.

The processor in FIG. 7 can implement the methods as described in this application. For example, the processor of the computer system 700 can create the blended representation as described in FIGS. 1 and 4, can enable the user to create the blended representation as described in FIG. 2, can display the comparison between various profiles as shown in FIGS. 3A-3C, etc., and the main memory, non-volatile memory and/or the drive unit of computer system 700 can store the various printing profiles and the blended representations. The video display of computer system 700 can display the visualizations as shown in FIGS. 3A-3C.

This disclosure contemplates the computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor may be, for example, a conventional microprocessor such as an Intel Pentium microprocessor or Motorola power PC microprocessor. One with skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 700. The interface can include an analog modem, ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system 700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct a more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the terms "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., compact disk read-only memory (CD-ROMs), digital versatile disks, (DVDs), etc.), among others, and transmission type media, such as digital and analog communication links.

In some circumstances, operation of a memory device, such as a change in state from a binary one to a binary zero or vice-versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list in which a change in state from a binary one to a binary zero or vice-versa in a memory device may include a transformation, such as a physical transformation. Rather, the foregoing are intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specifications has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to reduce an amount of ink used during printing while substantially preserving image quality comprising:
receiving a plurality of printing profiles indicating a tradeoff between a plurality of desired behaviors including a color smoothness and an ink usage, wherein a first printing profile in the plurality of printing profiles produces a higher image quality and uses more ink than a second printing profile in the plurality of printing profiles;
obtaining a blend between the first printing profile and the second printing profile;
based on the blend, creating a blended representation configured to reduce the amount of ink used during printing while substantially preserving the image quality, the blended representation comprising a new printing profile or a description of how to combine images associated with the first printing profile and the second printing profile;
creating on a continuous-tone display a visual comparison between the first printing profile in the plurality of printing profiles and the blended representation, the visual comparison including a plurality of collocated images,
wherein a first image among the plurality of collocated images is created using the first printing profile and a second image among the plurality of collocated images is created using the blended representation, and
wherein the plurality of collocated images includes a plurality of superimposed images or a plurality of split screen images; and
reducing the amount of ink used during printing while substantially preserving the image quality by printing an image using the blended representation.

2. A method comprising:
receiving a plurality of printing profiles indicating a tradeoff between desired printer behaviors, wherein a first printing profile in the plurality of printing profiles produces a higher image quality and enhances an undesirable property associated with printing an image, more than a second printing profile in the plurality of printing profiles;
creating a blended representation by combining the first printing profile and the second printing profile and diminishing the undesirable property associated with printing the image while substantially preserving image quality; and
creating on a display a visual comparison between the first printing profile in the plurality of printing profiles and the blended representation, the visual comparison including a plurality of collocated images,
wherein a first image among the plurality of collocated images is created using the first printing profile and a second image among the plurality of collocated images is created using the blended representation, and
wherein the plurality of collocated images includes a plurality of superimposed images or a plurality of split screen images.

3. The method of claim 2, comprising:
calculating a first amount of the undesirable property associated with the first printing profile and a second amount of the undesirable property associated with the blended representation; and
providing a comparison between the first amount of the undesirable property and the second amount of the undesirable property.

4. The method of claim 2, the undesirable property comprising an ink usage, a printing time, or a wear and tear on a printer nozzle.

5. The method of claim 2, comprising:
receiving an image to reproduce;
detecting a property associated with the image to reproduce, the property comprising an object in the image to reproduce or a type of the image to reproduce; and
based on the property determining a blend between the first printing profile and the second printing profile.

6. The method of claim 2, wherein the blended representation adopts the first printing profile for a portion of the image and the second printing profile elsewhere.

7. The method of claim 2, wherein the blended representation indicates a first amount of the first printing profile and a second amount of the second printing profile to use when reproducing the image.

8. The method of claim 2, wherein the blended representation indicates a color, a first amount of the first printing profile and a second amount of the second printing profile to use when reproducing the color.

9. The method of claim 2, the visual comparison showing a first appearance of a color in the image printed using the first printing profile and a second appearance of the color in the image printed using the blended representation.

10. The method of claim 2, the visual comparison showing a first halftone appearance of the image printed using the first printing profile and a second halftone appearance of the image printed using the blended representation.

11. The method of claim 2, said creating the visual comparison comprising:
determining a parameter in the first printing profile and the second printing profile that produces a visible difference when the image is printed using the first printing profile and the image is printed using the second printing profile; and
creating the visual comparison by displaying the first image representing a value of the parameter associated with the first printing profile and the second image representing the value of the parameter associated with the second printing profile and presenting the first image and the second image for comparison.

12. The method of claim 2, comprising:
providing a visualization manipulation tool enabling a user to select at least two printing profiles and to define at least two portions of the image to be displayed using the at least two printing profiles to create the visual comparison.

13. A system comprising:
one or more processors;
memory coupled to the one or more processors, wherein the memory includes instructions executable by the one or more processors to:
receive a plurality of printing profiles indicating a tradeoff between desired printer behaviors, a first printing profile in the plurality of printing profiles producing a higher image quality and enhancing a property associated with printing an image more than a second printing profile in the plurality of printing profiles;
create a blended representation by combining the first printing profile and the second printing profile and diminishing the property associated with printing the image while substantially preserving image quality;
create on a display a visual comparison between the first printing profile in the plurality of printing profiles and the blended representation, the visual comparison including a plurality of collocated images, wherein a first image among the plurality of collocated images is created using the first printing profile and a second image among the plurality of collocated images is created using the blended representation, and
wherein the plurality of collocated images includes a plurality of superimposed images or a plurality of split screen images.

14. The system of claim 13, the property comprising an ink usage, a printing time, or a wear and tear on a printer nozzle.

15. The system of claim 13, wherein the blended representation adopts the first printing profile for a portion of the image and the second printing profile elsewhere.

16. The system of claim 13, comprising instructions to:
calculate a first amount of ink usage by the first printing profile and a second amount of ink usage by the blended representation; and
provide a comparison between the first amount of ink usage and the second amount of ink usage to a user.

17. The system of claim 13, comprising instructions to:
receive an image to reproduce;
detect an image property associated with the image to reproduce, the image property comprising an object in the image to reproduce or a type of the image to reproduce; and
based on the image property determine a blend between the first printing profile and the second printing profile.

18. The system of claim 13, comprising instructions to:
determine one or more properties associated with the image;
store the one or more properties and the blended representation in a database;
receive an image to reproduce;
determine one or more properties associated with the image to reproduce;
find a stored blended representation in the database associated with one or more properties matching the one or more properties associated with the image to reproduce better than majority of the one or more properties stored in the database; and
use the stored blended representation to print the image to reproduce.

19. The system of claim 13, the visual comparison showing a first appearance of a color in the image printed using the first printing profile and a second appearance of the color in the image printed using the blended representation.

20. The system of claim 13, the instructions to create on the display the visual comparison comprising instructions to:
determine a parameter associated with the first printing profile and the second printing profile that produces a visible difference when the image is printed using the first printing profile and the image is printed using the second printing profile; and
create the visual comparison by displaying the first image representing a value of the parameter associated with the first printing profile and the second image representing the value of the parameter associated with the second printing profile and presenting the first image and the second image for comparison.

* * * * *